(12) United States Patent
Birner et al.

(10) Patent No.: US 10,137,783 B2
(45) Date of Patent: Nov. 27, 2018

(54) HIGH-VOLTAGE VEHICLE NETWORK OF A MOTOR VEHICLE, QUICK-BREAK SWITCH AND METHOD OF OPERATING THE HIGH-VOLTAGE VEHICLE NETWORK

(71) Applicant: ELLENBERGER & POENSGEN GMBH, Altdorf (DE)

(72) Inventors: Markus Birner, Zirndorf (DE);
Manuel Engewald, Nuremberg (DE);
Klaus Gottschalk, Altdorf (DE); Patric Gross, Pyrbaum (DE); Peter Meckler, Hohenstadt/Pommelsbrunn (DE);
Markus Miklis, Pfeifferhuette (DE);
Ricardo Pimenta, Eckental (DE);
Ewald Schneider, Offenhausen (DE)

(73) Assignee: Ellenberger & Poensgen GmbH, Altdorf (DE)

( * ) Notice: Subject to any disclaimer, the term of this patent is extended or adjusted under 35 U.S.C. 154(b) by 20 days.

(21) Appl. No.: 15/230,627

(22) Filed: Aug. 8, 2016

(65) Prior Publication Data
US 2016/0339784 A1    Nov. 24, 2016

Related U.S. Application Data

(63) Continuation of application No. PCT/EP2015/000221, filed on Feb. 4, 2015.

(30) Foreign Application Priority Data

Feb. 8, 2014   (DE) .................. 10 2014 001 708
Apr. 16, 2014  (DE) .................. 20 2014 003 287 U

(51) Int. Cl.
*B60L 3/04* (2006.01)
*B60K 28/14* (2006.01)
(Continued)

(52) U.S. Cl.
CPC ............... *B60L 3/04* (2013.01); *B60K 28/14* (2013.01); *B60L 3/0007* (2013.01);
(Continued)

(58) Field of Classification Search
CPC ........ B60L 3/04; B60L 3/0007; B60L 3/0046; B60L 3/0069; B60L 11/1864;
(Continued)

(56) References Cited

U.S. PATENT DOCUMENTS 5,818,122 A    10/1998 Miyazawa et al.
2008/0297303 A1   12/2008 Tabatowski-Bush et al.
(Continued)

FOREIGN PATENT DOCUMENTS

DE    19712544 A1   11/1997
DE    10333674 A1    2/2005
(Continued)

*Primary Examiner* — Hal Kaplan
(74) *Attorney, Agent, or Firm* — Laurence A. Greenberg; Werner H. Stemer; Ralph E. Locher

(57) ABSTRACT

A high-voltage motor vehicle electric system contains a high-voltage battery and a consumer network which are interconnected by an electric cable, and a quick-break switch for disconnecting the high-voltage battery from the consumer network. The quick-break switch receives an airbag signal. The airbag signal is used for actuating the quick-break switch to sever the electric cable supplying power to the consumer network.

8 Claims, 3 Drawing Sheets

(51) Int. Cl.
  *B60R 21/01*   (2006.01)
  *B60L 3/00*    (2006.01)
  *B60L 11/18*   (2006.01)
  *H01H 50/20*   (2006.01)
  *B60R 16/03*   (2006.01)
  *H01H 39/00*   (2006.01)
  *B60K 28/00*   (2006.01)

(52) U.S. Cl.
  CPC ........... *B60L 3/0046* (2013.01); *B60L 3/0069* (2013.01); *B60L 11/1864* (2013.01); *B60L 11/1879* (2013.01); *B60R 16/03* (2013.01); *B60R 21/01* (2013.01); *H01H 39/00* (2013.01); *H01H 50/20* (2013.01); *B60K 2028/006* (2013.01); *B60R 2021/01252* (2013.01); *H01H 2039/008* (2013.01); *Y02T 10/7005* (2013.01); *Y02T 10/7061* (2013.01)

(58) Field of Classification Search
  CPC ................ B60L 11/1879; B60K 28/14; B60K 2028/006; B60R 16/03; B60R 21/01; B60R 2021/01252; B60R 2021/012; H01H 39/00; H01H 50/20; H01H 2039/008; Y02T 10/7005; Y02T 10/7061

USPC .................................................. 307/9.1, 10.1
  See application file for complete search history.

(56) References Cited

U.S. PATENT DOCUMENTS

| | | |
|---|---|---|
| 2010/0271170 A1 | 10/2010 | Meckler et al. |
| 2013/0144477 A1 | 6/2013 | Yamada et al. |
| 2014/0326122 A1 | 11/2014 | Ukon et al. |

FOREIGN PATENT DOCUMENTS

| | | | |
|---|---|---|---|
| DE | 102008034877 A1 | | 1/2010 |
| DE | 102008047502 A1 | | 4/2010 |
| DE | 102009036672 A1 | * | 5/2010 |
| DE | 102010026768 A1 | | 4/2011 |
| DE | 102009051293 A1 | * | 5/2011 |
| DE | 102011103834 A1 | | 12/2012 |
| DE | 102012204788 A1 | | 9/2013 |
| EP | 2243668 A1 | | 10/2010 |
| JP | 109263193 A | | 10/1997 |
| JP | 2010153371 A | | 7/2010 |
| WO | 2013080545 A1 | | 6/2013 |

* cited by examiner

HIGH-VOLTAGE VEHICLE NETWORK OF A MOTOR VEHICLE, QUICK-BREAK SWITCH AND METHOD OF OPERATING THE HIGH-VOLTAGE VEHICLE NETWORK

CROSS-REFERENCE TO RELATED APPLICATION

This is a continuation application, under 35 U.S.C. § 120, of copending international application No. PCT/EP2015/000221, filed Feb. 4, 2015, which designated the United States; this application also claims the priority, under 35 U.S.C. § 119, of German patent application No. DE 10 2014 001 708.7, filed Feb. 8, 2014, and of German patent application No. DE 20 2014 003 287.4, filed Apr. 16, 2014; the prior applications are herewith incorporated by reference in their entireties.

BACKGROUND OF THE INVENTION

Field of the Invention

The invention relates both to a high-voltage vehicle network of a motor vehicle with a high-voltage battery, with a consumer network and a quick-break switch as well as to a quick-break switch.

Motor vehicles are increasingly driven by an electric motor. A distinction is drawn in this case between pure electric vehicles and hybrid vehicles. In hybrid vehicles, in addition to the electric motor, a combustion engine is also present, by which the electrical energy required for operation of the electric motor is generated. The electric motor is usually part of a consumer network that is operated at a comparatively high electrical voltage, e.g. 450 V. An electrical voltage is provided by a high-voltage battery, and is output by an electrical cable to a converter for operation of the electric motor. Usually the electrical cable contains a relay, by which the supply of current can be started or stopped. This relay is, for example, connected to an ignition lock or the like, so that when the motor vehicle is parked, the converter and the electric motor are without electrical power.

In the event of an accident it is necessary to disconnect the high-voltage battery from the consumer network comparatively quickly and safely. Otherwise, as a result of damage in the consumer network and/or the electrical connection, short-circuits may arise which in turn can contribute to the development of a fire. It is also possible for the high-voltage battery itself to be overloaded, and thus to explode. Equally it is possible that parts of the motor vehicle, following an accident, are electrically live, which makes the rescue of occupants located within the motor vehicle more difficult.

Due to the inertia of the relay, fast disconnection of this sort is not possible using the relay that is present. It can also happen that, as a result of excess current already having occurred, the relay contacts of the relay have fused together and thus, even if the relay is appropriately driven, cannot separate from one another and thus interrupt the flow of current.

The high-voltage vehicle network must also be monitored for an accident. This is achieved, for example, by monitoring the consumer network for a short-circuit. As soon as a short circuit of this sort is detected, the high-voltage battery is disconnected from the consumer network. The disadvantage here is that the short-circuit must already have occurred, and that a possible fire may already have started.

SUMMARY OF THE INVENTION

The invention is based on the object of permitting a particularly appropriate disconnection of a high-voltage battery from a consumer network which, in the event of an accident, triggers in particular comparatively quickly and reliably, and which advantageously is galvanic.

The high-voltage vehicle network of a motor vehicle contains a high-voltage battery and a consumer network which are interconnected by an electrical cable. The electrical voltage provided by the high-voltage battery is here preferably greater than 300 V, 350 V, and in particular greater than or equal to 375 V. Expediently the electrical voltage is greater than or equal to 400 V or 450 V. For example the electrical voltage is less than 500 V, 600 V or 700 V. The electrical cable contains at least two conductors, wherein each conductor is contacted electrically by one of the two poles of the high-voltage battery. The high-voltage vehicle network furthermore contains a quick-break switch, by which a disconnection of the high-voltage battery from the consumer network is possible. In particular, the quick-break switch contains a switch, which is included in one of the two conductors of the electrical cable, and which, when opened, interrupts the flow of current in the electrical cable.

The quick-break switch receives an airbag signal of the motor vehicle. In other words, the quick-break switch is triggered as soon as an airbag signal is present. For this purpose the quick-break switch is, in particular, directly coupled in signal terms to an airbag control device. Alternatively, the signal is made available over a bus system, such as CAN bus or FlexRay, in which case the quick-break switch and the airbag control device are preferably part of the bus system. Airbag signal here refers in particular to the signal whose occurrence ignites at least a propellant charge of an airbag present in the motor vehicle, thus causing an airbag to be inflated. The airbag signal is established on the basis of sensors that are already present in the motor vehicle. Due to the use of the airbag signal, therefore, no other components are necessary to detect that the motor vehicle is in an accident. The airbag signal is also one of the first signals in the motor vehicle to indicate an accident. Consequently the high-voltage battery is disconnected comparatively early from the consumer network, even before any possible short-circuits develop within the consumer network.

In the event that the airbag signal is generated incorrectly, and the high-voltage battery is therefore disconnected from the consumer network, then, as a result of the airbag being triggered, it is not possible for the motor vehicle to start operation again immediately. The motor vehicle must, rather, be repaired in a workshop. The high-voltage battery is reconnected to the consumer network in the course of such a repair. As a result of this, the motor vehicle is not out of operation for any additional time even when the quick-break switch has been incorrectly triggered, since it must always be repaired as a result of the triggered airbag.

In summary, the airbag signal refers in particular to the signal by which the airbag is caused to ignite. The airbag signal appropriately also refers to any signal of a sensor for monitoring the state of the motor vehicle that indicates a crash or an accident. In particular, the airbag signal corresponds to any crash signal of the motor vehicle. For example, such a crash signal is transmitted over a special cable or over the bus system, if one is present, to the quick-break switch.

In one suitable form of embodiment of the invention, the electrical cable that connects the high-voltage battery to the consumer network contains the quick-break switch. The quick-break switch contains a relay with relay contacts and with a magnetic drive, wherein, when the relay is operating, the relay contacts are moved relative to one another by the magnetic drive. The relay serves in particular for starting operation of the motor vehicle. In other words, a supply of current to the electric motor, if one is present, or to a converter is started by the relay and stopped when the motor vehicle is halted. The magnetic drive contains a control cable connected to a relay drive, wherein the relay drive is connected in particular to an ignition lock and/or a gas pedal of the motor vehicle.

The relay is expediently open when not electrically powered. Consequently in the event of an interruption of a flow of current by the control cable, a flow of current through the electrical cable from the high-voltage battery to the consumer network is interrupted. In this way, in the event of a technical fault of the motor vehicle, in particular of the control cable, the motor vehicle is placed in a safe state. A fault of this sort occurs, for example, during an accident.

The quick-break switch further contains an auxiliary drive with an activation cable that receives the airbag signal. In other words, the auxiliary drive is triggered as soon as the airbag signal is present. By use of the auxiliary drive, an opening of the relay contacts in the event of the presence of the airbag signal is accelerated. In other words, the relay contacts open more quickly when the auxiliary drive is activated than they would do if operated only by the magnetic drive. In particular, the auxiliary drive is non-reversible. For example, the auxiliary drive is operated by stored mechanical force, such as by a spring. Alternatively, the auxiliary drive is magnetic, wherein a magnetic field is generated by the auxiliary drive that is opposed to the magnetic field for closing the relay contacts that is generated by the magnetic drive. It follows that an opposing field is provided by the auxiliary drive in the activated state. It is particularly preferred for the auxiliary drive to be pyrotechnic, and expediently to comprise an explosive or propellant charge. A comparatively fast actuation of the auxiliary drive is enabled in this way.

The magnetic drive appropriately comprises a movable impact armature which is in particular in operative connection with the relay contacts. The position of the relay contacts with respect to one another is thus determined by the position of the impact armature, and a flow of current from the high-voltage battery to the consumer network is thus enabled or interrupted. In particular, the impact armature is shaped in the form of a cylinder and/or arranged inside an electric coil. The impact armature is here in particular implemented as a permanent magnet, so that the position of the impact armature is changed when current is made to flow through the electric coil.

Expediently the auxiliary drive acts on the impact armature. In other words, in the event of the auxiliary drive being actuated, the auxiliary drive is in operative connection with the impact armature. For example, in the event of the auxiliary drive being actuated, the impact armature moves at least partially out of the coil of the magnetic drive. In particular, the auxiliary drive is a further electric coil, which, in the event of the auxiliary drive being actuated, is subjected to a comparatively high current flowing through it, so that the impact armature is, even when the magnetic drive is activated, moved into such a position that the relay contacts are opened. Alternatively, or in combination with this, a mechanical spring, which is under tension when the auxiliary drive is not activated, acts on the impact armature when the auxiliary drive is activated.

It is particularly preferable for the impact armature to be conveyed by an explosive charge of the auxiliary drive out of the coil which may be present, or at least for its position to be changed such that the relay contacts are opened. The auxiliary drive is consequently of pyrotechnic design. Expediently the auxiliary drive contains for this purpose a punch that is arranged between the pyrotechnic charge and the impact armature. In particular, the guide of the punch is flush with the guide of the impact armature and expediently the punch is guided at least partially by the guide of the impact armature in the event of the auxiliary drive being triggered. Due to the use of the punch, a comparatively strong pyrotechnic propellant charge can be used. The punch here is configured for the comparatively high active pressures of the propellant charge. The impact armature, on the other hand, can be optimized for its magnetic properties, without having to be concerned about particular resistance to heat.

In particular, the auxiliary drive contains a separating element for severing the control cable. In other words, in the event that the auxiliary drive is activated, the control cable of the magnetic drive is severed, and the relay is thus without electrical power. For example, the control cable is cut by a cutting element, or is entirely destroyed in one region. Expediently, the relay is open when without electrical power, so that even in the event of a damaged relay drive, the relay is transferred by the separating element into an open state, and the consumer network is thus without electrical power. In particular, the separating element contains a punch that is mounted in a guide. In the event of an activation of the auxiliary drive, the punch is moved along the guide, whereby a pyrotechnic element, which preferably is positioned at one end of the punch in the direction of the guide, is preferably ignited when the auxiliary drive is activated. The punch has a hole that runs perpendicularly to the guide of the punch. The control cable, or at least an electrical conductor of the control cable of the magnetic drive, is arranged inside the hole. When the punch moves along the guide, the control cable is consequently stretched out until it breaks, and thus a flow of current through the control cable is interrupted.

Expediently the punch here also acts on the impact armature, if this is present. As a result of this, power is switched off from the magnetic drive and the impact armature, which is in operative connection with the relay contacts, is also moved. In summary, the quick-break switch particularly contains the magnetic drive and the impact armature, which is in operative connection with the relay contacts. The impact armature is arranged here inside an electric coil. The quick drive furthermore contains the punch with the hole, through which the control cable of the magnetic drive passes. The guide of the punch is here flush with the guide of the impact armature of the magnetic drive. As a consequence, if the auxiliary drive is triggered, the control cable of the relay is first severed, and then the impact armature is moved at least partially out of the electric coil by the punch, so that the relay contacts are opened. In this way, a comparatively fast opening of the relay contacts is enabled.

In an alternative form of embodiment of the invention, the auxiliary drive is in operative connection with an insulating bulkhead for mechanically disconnecting the relay contacts. In particular the insulating bulkhead is driven by the auxiliary drive between the two relay contacts. For example, the insulating bulkhead is here shaped in the manner of a wedge and consists of an electrically insulating material. In the un-triggered state of the auxiliary drive, the wedge is displaced perpendicularly in respect of the closing direction of the relay contacts, and advantageously already lies at the side of the relay contacts. If the auxiliary drive is activated, the wedge is moved between the relay contacts, and thus the relay contacts are mechanically disconnected from one another. In this way the development of an arc between the relay contacts is prevented, and electrical power is comparatively quickly switched off from the consumer network. An unwanted reactivation of the relay is also prevented, since the insulating bulkhead between the relay contacts prevents the relay from carrying current.

In a further form of embodiment of the invention, the electrical cable contains an over current protection, implemented for example as a circuit breaker or, particularly preferably, as a fusible link. The over current protection is configured such that it is triggered by a short-circuit current of the high-voltage battery. The electrical cable further contains a short-circuit bridge, connected in parallel to the consumer network. The over current protection is here arranged on the battery side of the short-circuit bridge. In particular the electrical cable contains two electrical conductors, each of which is connected to one of the two poles of the high-voltage battery. One of the electrical conductors here contains the overcurrent protection. The two electrical conductors are connected together by the short-circuit bridge, wherein the over current protection is integrated into the circuit formed in this way.

The short circuit bridge contains the quick-break switch. If an air bag signal occurs, the short-circuit bridge is switched into a conductive state, so that a comparatively low electrical resistance is present in the electric circuit formed by the short-circuit bridge and the high-voltage battery. As a result, the short-circuit current of the high-voltage battery flows through the short-circuit bridge and the over current protection, which triggers as a result. In this way a flow of current through the electrical cable is interrupted and, as a consequence, the consumer network is also without electrical power. In this way, when the short-circuit bridge is short-circuited, the electrical energy flowing through the consumer network is already reduced even before the over current protection is triggered, which reduces the occurrence of fires or damage to other components of the motor vehicle. As a result of the overcurrent protection, a galvanic disconnection is implemented between the high-voltage battery and the consumer network. Expediently, in normal operation of the high-voltage vehicle network, the short-circuit bridge is open. In other words, the short-circuit bridge does not carry current when the quick-break switch is not activated.

The quick-break switch advantageously contains a semiconductor switch for this purpose, and, in particular, appropriate electronics, with which the air bag signal is processed. Due to the semiconductor switch, a comparatively fast switching to a conductive state of the short-circuit bridge is enabled. In particular, the semiconductor switch is closed when an electrical voltage is not present. In this way, in the event of a failure of the electronics, it is ensured that the electrical supply to the consumer network is switched off. A TRIAC or a thyristor is preferably used as the semiconductor switch. Preferably the quick-break switch consists of the semiconductor switch and of whatever electronics may be necessary to drive the semiconductor switch, wherein the semiconductor switch is connected into the current path of the short-circuit bridge. Alternatively, the quick-break switch contains a relay which is, for example, operated magnetically or pyrotechnically. By use of the relay, a flow of current through the short-circuit bridge is enabled or interrupted.

In a further form of embodiment of the invention, the quick-break switch is part of the electrical cable that connects the high-voltage battery to a consumer network, and contains a relay and a semiconductor switch that are connected in series. The relay for example receives, in addition to the air bag signal, also control signals which are generated in particular by a gas pedal. When the airbag signal occurs, both the semiconductor and the relay are transferred into an open state. The semiconductor switch here exhibits a comparatively fast switching characteristic, so that electrical power is comparatively quickly removed from the consumer network. By means of opening the comparatively slow relay, in addition, a galvanic disconnection between the consumer network and the high-voltage battery is realized. Consequently the quick-break switch enables a disconnection of consumer network from the high-voltage battery that is both fast and secure.

The quick-break switch is preferably part of a motor vehicle, and contains a relay with a magnetic drive and an auxiliary drive. The auxiliary drive is, expediently, mechanical, magnetic or, particularly preferably, pyrotechnic, and contains an activation cable, via which a control signal for activating the auxiliary drive is output. The magnetic drive contains a control cable that is connected to a relay drive, wherein the supply of current to the magnetic drive is made by the relay drive. Expediently, the auxiliary drive contains a separating element, by which, when the auxiliary drive is activated, the control cable of the relay is severed. In this way, an activation of the magnetic drive is interrupted, in particular irreversibly. Alternatively, or in combination with this, the effect of the magnetic drive is reinforced by the auxiliary drive, in particular the drive in a single, particular direction. The auxiliary drive appropriately acts on an impact armature of the magnetic drive, if this is present.

Expediently the disconnecting element is a punch with a hole perpendicular to a guide of the punch, and the control cable of the relay is passed through the hole. In this way, a change in the position of the control cable with respect to the punch is prevented, and a severing of the control cable when the auxiliary drive is triggered is always ensured. Expediently, the punch acts on an impact armature, if present, of the magnetic drive, so that this is moved by means of the punch when the auxiliary drive is activated. In this way an activation of the magnetic drive is cancelled when the auxiliary drive is triggered, and the magnetic drive is transferred into a defined state.

The electrical connection between a high-voltage battery of a high-voltage vehicle network of a motor vehicle and a consumer network is interrupted as soon as an airbag signal occurs. In other words, the airbag signal is employed as the trigger condition for interrupting the electrical connection between the high-voltage battery and the consumer network. In this way, further sensors for monitoring the motor vehicle as to whether an accident is present are not necessary. The airbag signal is also of comparatively assured quality, so that false triggering is only comparatively rare. In particular, the airbag signal is detected first, and after detection, the electrical connection is interrupted in a further working step.

Other features which are considered as characteristic for the invention are set forth in the appended claims.

Although the invention is illustrated and described herein as embodied in a high-voltage vehicle network of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts and magnitudes that correspond to one another are always given the same reference signs in the figures.

Figure 1:
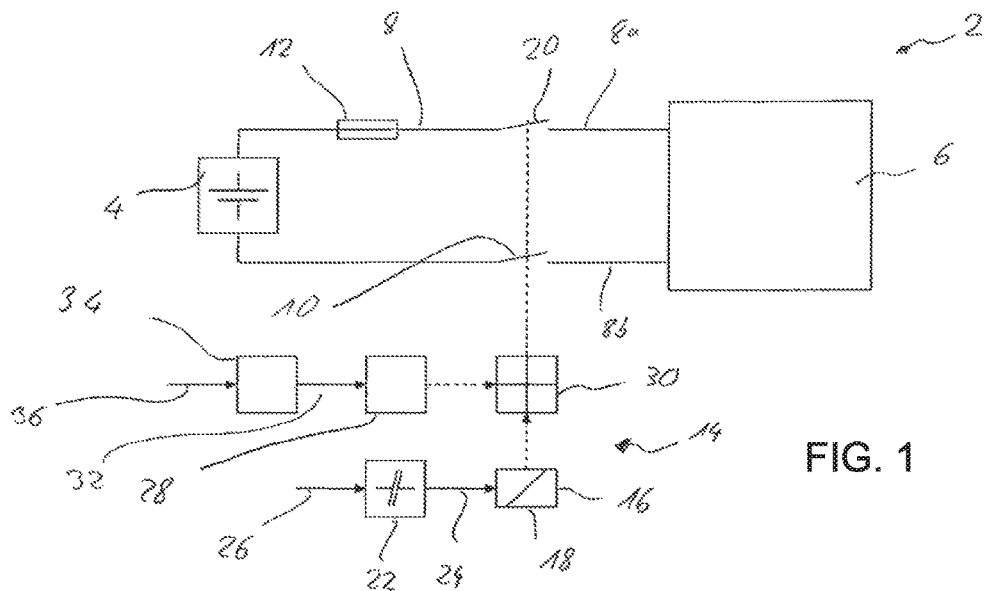
FIG. 1 is a block diagram of a high-voltage vehicle network of a motor vehicle with a quick-break switch according to the invention.

Referring now to the figures of the drawings in detail and first, particularly to FIG. 1 thereof, there is shown a high-voltage vehicle network 2 of a motor vehicle. The high-voltage vehicle network 2 contains a high-voltage battery 4 and a consumer network 6. An electrical DC voltage of 450 V is made available by the high-voltage battery 4, and is fed over an electrical cable 8 with two electrical conductors 8a, 8b into the consumer network 6. One of the electrical conductors 8a makes electrical contact with the positive pole of the high-voltage battery 4, and the remaining electrical conductor 8b makes electrical contact with the negative pole of the high-voltage battery 4. The consumer network 6 contains a converter, not illustrated, by which the DC voltage is transformed. An electric motor, which drives the motor vehicle that contains the high-voltage vehicle network 2, is driven by the transformed voltage.

The conductor 8b which makes electrical contact with the negative pole of a high-voltage battery 4 contains a relay 10 which is actuated, in a manner not indicated more precisely, by means of an ignition (ignition lock) or a gas pedal of the motor vehicle. The electrical conductor 8a that makes electrical contact with the positive pole contains an overcurrent protection 12, which is implemented as a fusible link, and a quick-break switch 14. The quick-break switch 14 contains a relay 16 with a magnetic drive 18 which acts on two relay contacts 20. The magnetic drive 18 is controlled by a relay drive 22 that is connected to the magnetic drive 18 by a control cable 24. Control signals 26 that are created by the ignition of the motor vehicle 2, in particular by an ignition key or the like, are detected for this purpose by the relay drive 22. If the control signals 26 are absent, the relay contacts 20 are open. In other words, the relay 16 is open when not electrically powered.

The quick-break switch 14 further contains an auxiliary drive 28, which is mechanically coupled to the magnetic drive 18 by a coupling 30. The auxiliary drive 28 contains an activation cable 32 that is connected to a controller 34. The controller 34 is connected to a bus system, and monitors this for an airbag signal 36. The auxiliary drive 28 is either an electric coil, a spring under tension, or a pyrotechnic explosive charge.

In normal operation of the motor vehicle, the relays 10, 16 are controlled by the control signal 26 created by the gas pedal or the ignition lock of the motor vehicle. In the event of an accident to the motor vehicle, the airbag signal 36 is generated, as a result of which an airbag of the motor vehicle is ignited. In addition, the airbag signal 36 is detected by the controller 34, and passed on via the activation cable 32 to the auxiliary drive 28, which triggers as a result. The auxiliary drive 28 acts, by means of the coupling 30, on the relay contacts 20, causing them to open. As a result, the consumer network is galvanically disconnected from the high-voltage battery 4, and damage to or ignition of components of the consumer network 6 is prevented.

Figure 2:
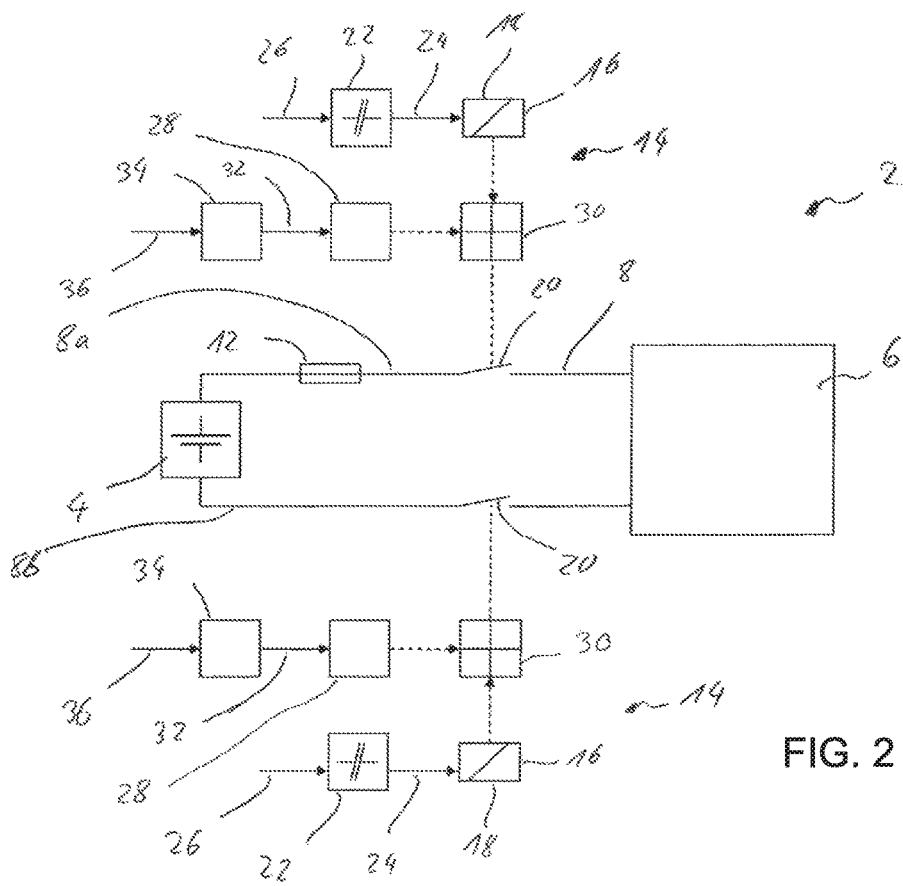
FIG. 2 is a block diagram of the high-voltage vehicle network of the motor vehicle with two quick-break switches.

FIG. 2 illustrates a further embodiment of the high-voltage vehicle network 2. In comparison to the variant of the high-voltage vehicle network 2 illustrated in FIG. 1, the relay 10 that is fitted into the conductor 8b that makes contact with the negative pole of the high-voltage battery 4 is replaced by the quick-break switch 14. Thus in normal operation of the high-voltage vehicle network 2, no differences result, since the relay 16 of the second quick-break switch 14 performs the functions of the replaced relay 10. In the event of an accident to the motor vehicle, and to the presence of the airbag signal 36, and to a triggering of the two auxiliary drives 28 that are present, however, the conductor 8b that is connected to the negative pole of the high-voltage battery 4 is also, in addition to the conductor 8a that is connected to the positive pole of the high-voltage battery 4, disconnected by the relay contacts 20, and thus the high-voltage battery 4 is securely disconnected from the consumer network 6 even in the event of an unwanted bridging of the electrical conductor 8a that is connected to the positive pole.

Figure 3A:
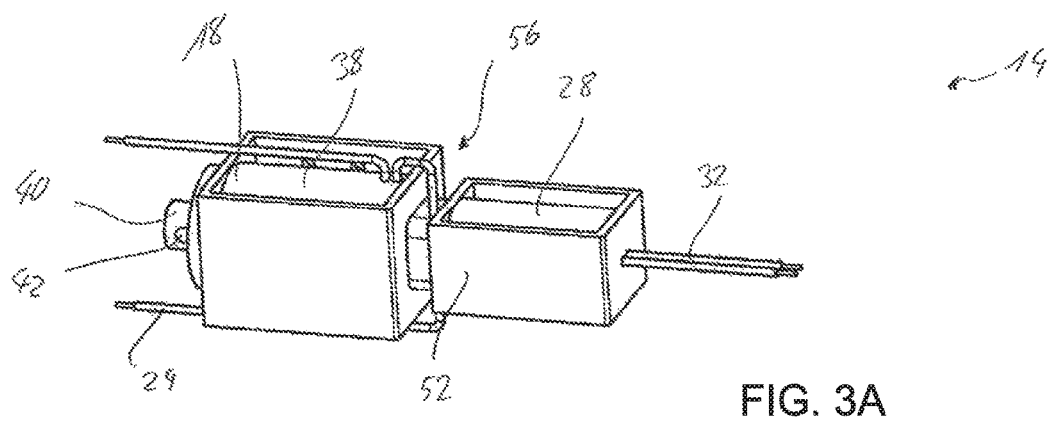
FIG. 3A is a diagrammatic, perspective view of the quick-break switch.
Figure 3B:
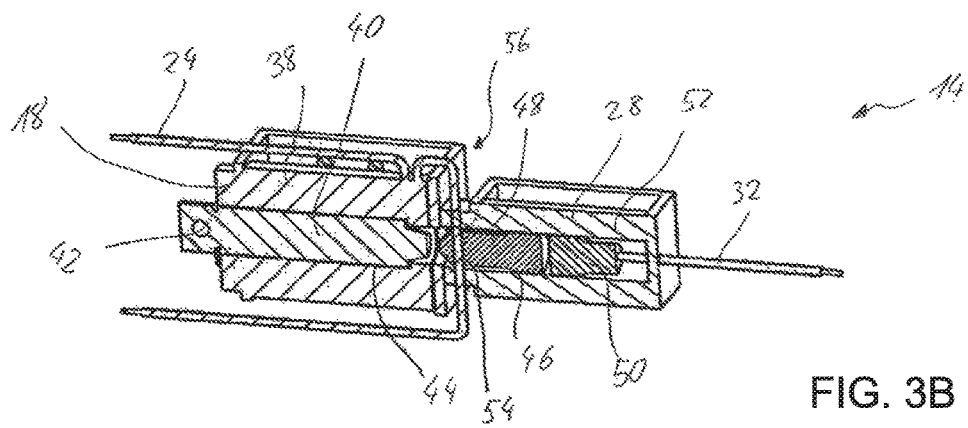
FIG. 3B is a sectional view of the quick-break switch.

A form of embodiment of the quick-break switch 14 is shown in perspective in FIG. 3A and in a perspective sectional view in FIG. 3B. The magnetic drive 18 contains an electric coil 38, whose electric terminals end in the control cable 24. An impact armature 40 made of a magnetic material with a preferred magnetic direction is positioned inside the coil 38. At one free end, the essentially cylindrical impact armature 40 has a hole 42, which is in operative connection through a linkage, not illustrated, with the relay contacts 20. Depending on the position of the hole 42 with respect to the coil 38, the relay contacts 20 are open or closed. A guide 46 of a punch 48 of the auxiliary drive 28 is flush with a guide 44 of the impact armature 40. The punch 48 consists of a comparatively tough material such as steel. By means of the punch 48, a movement of the impact armature 40 in the direction opposite to that of the hole 42, is limited. A pyrotechnic propelling charge 50 is positioned inside a housing 52 which contains the guide 46, on the side of the punch 48 that lies opposite to the impact armature 40. The propellant charge 50 is thus fully enclosed by the housing 52 and the punch 48, and the activation cable 32 of the auxiliary drive 28 ends inside the propellant charge 50.

The punch 48 has a hole 54 which runs perpendicularly to the guide 46 of the punch 48. One of the conductors of the control cable 24 of the magnetic drive 18, which is tightly connected, in the region that surrounds the punch 48, to the housing 52 of the auxiliary drive 28, runs through the hole 54. The punch 48, in connection both with holding the conductor of the activation cable 24, as well as with the relatively sharp-edged transitions, constitutes a disconnecting element 56 for severing the control cable 24.

When the airbag signal 36 appears, a spark occurs between the ends of the activation cable 32, which triggers the pyrotechnic propellant charge 50. Due to the chamberlike design of the space within which the propellant charge 50 is located, the punch 48 is accelerated along the guide 46 in the direction of the impact armature 40. As a result, by the punch 48 acting as a disconnecting element 46, the control cable 24 is sheared in the region between the punch 48 and the housing 52, and thereby severed, which occurs due to the movement of the region of the control cable 24 that is located inside the hole 54 in the direction of the impact armature 40 and of a stable position of the other region of the control cable 24, in connection with the comparatively sharp edges of the punch 48 and of the housing 52. As a result of this, a supply of current to the coil 38 is interrupted, and the impact armature 40 is moved by a spring, not illustrated here, in the direction of the hole 42, and the relay contacts 20 are then opened. The spring is the component of the relay 16 which, when current is switched off from the relay 16, transfers the relay contacts 20 into an open state. In addition, the impact armature 40 is accelerated by the punch 48 in the direction of the hole 42 when the airbag signal 36 occurs, which accelerates an opening movement of the relay contacts 20, preventing any melting between these that could arise as a result of an overcurrent.

Figure 4A:
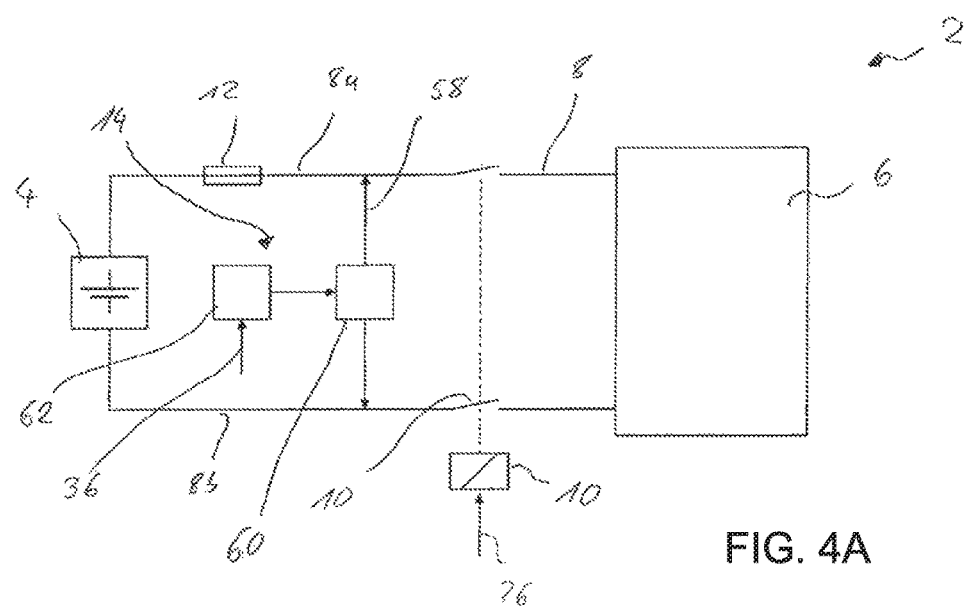
FIGS. 4A to 4C are block diagrams showing further forms of embodiments of the high-voltage vehicle network of a motor vehicle with a short-circuit bridge that contains the quick-break switch.

FIG. 4A illustrates a further form of embodiment of the high-voltage vehicle network 2 with the consumer network 6, the high-voltage battery 4 and the electrical cable 8, which also contains the over current protection 12. In comparison to the variant of the high-voltage vehicle network 2 shown in FIG. 1, the quick-break switch 14 with the relay 16 containing the relay contacts 20 is replaced by a further relay 10. Consequently, the electrical cable 8 contains a relay 10 in each of the two conductors 8a, 8b, which receive the control signal 26 that is created by the gas pedal or the ignition lock of the motor vehicle. The electrical cable 8 further contains a short-circuit bridge 58, by which the two conductors 8a, 8b of the electrical cable 8 make contact with one another, and which consequently is connected in parallel with the consumer network 6. The two relays 10 are here arranged between the short-circuit bridge 58 and the consumer network 6, whereas the overcurrent protection 12 is located on the battery side of the short-circuit bridge 58. The short-circuit bridge 58 contains the quick-break switch 14, which contains a semiconductor switch 60 in the form of a TRIAC and a controller 62. The controller 62 receives the airbag signal 36.

In normal operation of a high-voltage vehicle network 2, the semiconductor switch 60 is open, and consequently the short-circuit bridge 58 is not conductive. When the airbag signal 36 occurs, the semiconductor switch 60 is changed into a conductive state by the controller 62. Consequently, in this case, an electrical current is carried by the short-circuit bridge 58. The electrical resistance of the short-circuit bridge 58 is here less than the electrical resistance of the consumer network 6, so that the electrical energy made available by the battery 4 flows primarily only through the short-circuit bridge 58, and not in the consumer network 6. As a consequence of the short-circuit current flowing through the circuit comprised of the battery 4, in each case a part of the two conductors 8a, 8b, the over current protection 12 and the short-circuit bridge 58, the over current protection 12 is triggered, as a result of which a flow of current through the electrical cable 8 is prevented. As a result of this, the consumer network 6 is galvanically disconnected from the high-voltage battery 4.

Figure 4B:
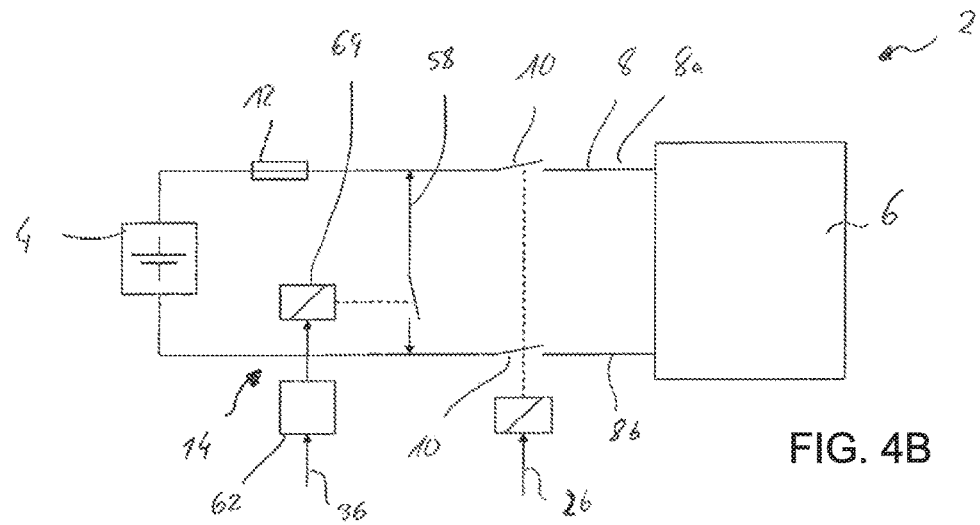

In comparison to the previously illustrated variant of the high-voltage vehicle network 2, in FIG. 4B the semiconductor switch 60 is replaced by a relay 64, and the controller 62 is modified for activation of the relay 64 instead of the semiconductor switch 60. Otherwise, the mode of operation of the quick-break switch 14 and of the over current protection 12 in connection with the short-circuit bridge 58 and the airbag signal 36 is as described in FIG. 4A.

Figure 4C:
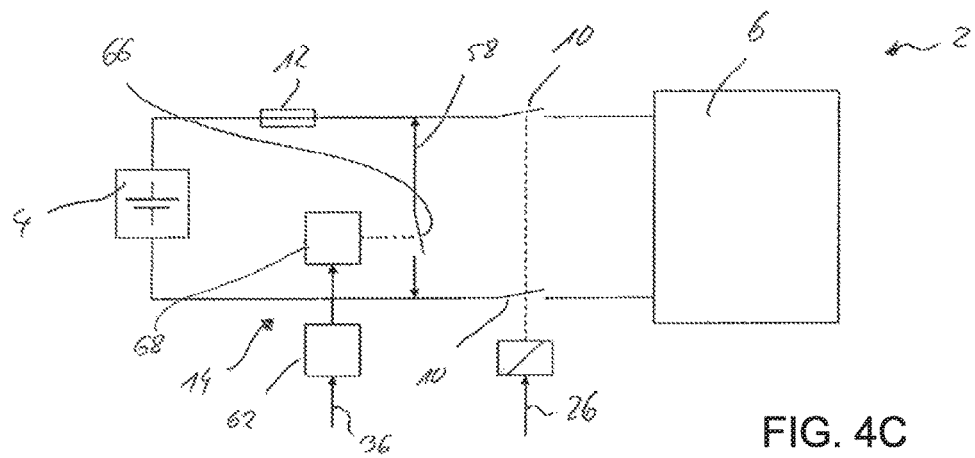

In a further form of embodiment of the high-voltage vehicle network 2 shown in FIG. 4C the quick-break switch 14 is replaced in comparison with the variant shown in FIG. 4B. The quick-break switch 14 again contains the controller 62 which receives the airbag signal 36. By means of this, however, a drive 68 that acts on two switch contacts 66 is operated. The drive 68 is, for example, implemented pyrotechnically, so that when the airbag signal 36 occurs, an explosive charge is ignited and the two switching contacts 66 are brought into contact with one another, which results in a conductive state of the short-circuit bridge 58.

Figure 5:
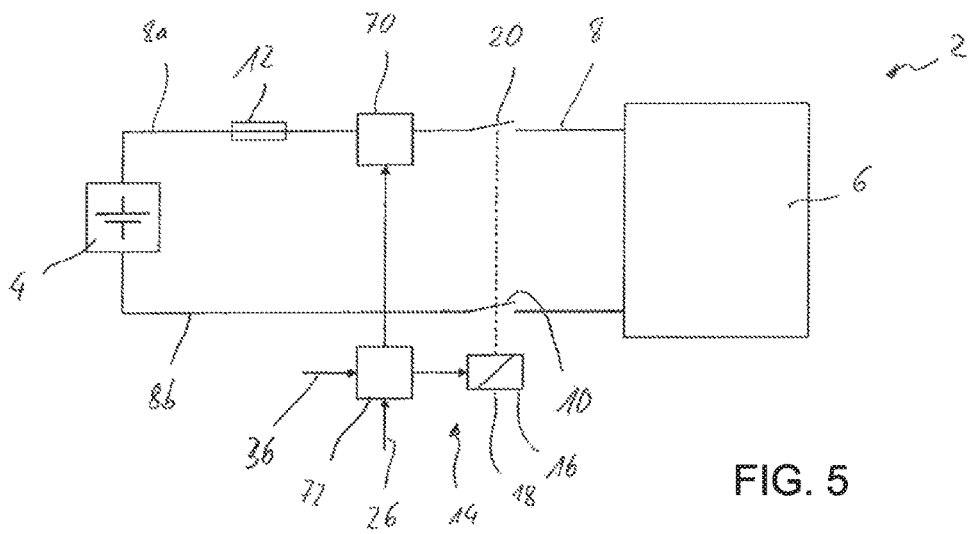
FIG. 5 is a block diagram of a further form of embodiment of the high-voltage vehicle network.

A final form of embodiment of the high-voltage vehicle network 2 is illustrated in FIG. 5, which, with the exception of the quick-break switch 14, corresponds to the form of embodiment illustrated in FIG. 1. The quick-break switch 14 shown here again contains the relay 16 with the magnetic drive 18 and the relay contacts 20, which are in operative connection with the magnetic drive 18. The quick-break switch 14 further contains a semiconductor switch 70 which is connected in series with the relay contacts 20 and the over current protection 12, and is arranged between these two. The quick-break switch 14 further contains a controller 72, which receives the control signals 26 and the airbag signal 36. During normal operation of the high-voltage vehicle network 2, the semiconductor switch 70 is always in a closed state, and consequently carries current. Due to the presence of control signals 26, the magnetic drive 18 is supplied with current by the controller 72, and the relay contacts 20 are consequently operated. When the airbag signal 36 occurs, the semiconductor switch 70 is switched by the controller 72, and consequently a flow of current through it is interrupted. In addition, the magnetic drive 18 is actuated, and the relay contacts 20 are separated from one another. Due to the actuation of the semiconductor switch 70, a comparatively fast interruption of a flow of current through the electrical cable 8 is enabled, whereas, as a result of the opening of the relay contacts 20, which is slow in comparison, a galvanic disconnection of the consumer network 6 from the high-voltage battery 4 is achieved. As a result, by the semiconductor switch 14, a comparatively fast current interruption followed by a galvanic disconnection is enabled.

The invention is not restricted to the exemplary embodiments described above. Rather, other variants of the invention can also be derived by the expert, without leaving the object of the invention. In particular, furthermore, all the individual features described in connection with the exemplary embodiments can also be combined with one another in other ways without leaving the object of the invention.

The following is a summary list of reference numerals and the corresponding structure used in the above description of the invention:

2 high-voltage vehicle network
4 high-voltage battery
6 consumer network
8 electrical cable
8a electrical conductor
8b electrical conductor
10 relay
12 overcurrent protection
14 quick-break switch
16 relay
18 magnetic drive 20 relay contact
22 relay drive
24 control cable
26 control signal
28 auxiliary drive
30 coupling
32 activation cable
34 controller
36 airbag signal
38 coil
40 impact armature
42 hole
44 impact armature guide
46 punch guide
48 punch
50 propellant charge
52 housing
54 hole
56 separating element
58 short-circuit bridge
60 semiconductor switch
62 controller
64 relay
66 switching contact
68 drive
70 semiconductor switch
72 controller

The invention claimed is:

1. A high-voltage vehicle network of a motor vehicle, the high-voltage network comprising:
a high-voltage battery;
a consumer network;
an electrical cable connecting said high-voltage battery to said consumer network;
a quick-break switch for disconnecting said high-voltage battery from said consumer network, said quick-break switch receiving an airbag signal, said quick-break switch containing a relay drive, an auxiliary drive having an activation cable and receiving the airbag signal, a magnetic drive with a control cable connected to said relay drive, and a relay with two relay contacts, said relay being open when not electrically powered; and
said magnetic drive having a movable impact armature, said auxiliary drive acting on said movable impact armature.

2. A high-voltage vehicle network of a motor vehicle, the high-voltage network comprising:
a high-voltage battery;
a consumer network;
an electrical cable connecting said high-voltage battery to said consumer network;
a quick-break switch for disconnecting said high-voltage battery from said consumer network, said quick-break switch receiving an airbag signal, said quick-break switch containing a relay drive, an auxiliary drive having an activation cable and receiving the airbag signal, a magnetic drive with a control cable connected to said relay drive, and a relay with two relay contacts, said relay being open when not electrically powered;
said auxiliary drive containing a separating element for cutting through said control cable, said separating element having a punch with a guide and a hole formed therein perpendicular to said guide of said punch, and said control cable passes through said hole.

3. A high-voltage vehicle network of a motor vehicle, the high-voltage network comprising:
a high-voltage battery;
a consumer network;
an electrical cable connecting said high-voltage battery to said consumer network;
a quick-break switch for disconnecting said high-voltage battery from said consumer network, said quick-break switch receiving an airbag signal;
said electrical cable having over current protection and a short-circuit bridge connected in parallel with said consumer network, said over current protection is disposed on a battery side of said short-circuit bridge, and said short-circuit bridge containing said quick-break switch.

4. The high-voltage vehicle network according to claim 3, wherein said quick-break switch contains a semiconductor switch or a relay, which is closed when not electrically powered.

5. A high-voltage vehicle network of a motor vehicle, the high-voltage network comprising:
a high-voltage battery;
a consumer network;
an electrical cable connecting said high-voltage battery to said consumer network;
a quick-break switch for disconnecting said high-voltage battery from said consumer network, said quick-break switch receiving an airbag signal and having a relay and a semiconductor switch connected in series; and
said electrical cable containing said quick-break switch having said relay and said semiconductor switch connected in series.

6. The high-voltage vehicle network according to claim 3, wherein said over current protection is a fusible link.

7. A quick-break switch, comprising:
an auxiliary drive;
a relay drive;
a relay having a magnetic drive with a control cable connected to said relay drive; and
said auxiliary drive having an activation cable and a separating element for severing said control cable.

8. The quick-break switch according to claim 7, wherein said auxiliary drive is a pyrotechnic drive.

* * * * *